US009300586B2

United States Patent
Jiang et al.

(10) Patent No.: US 9,300,586 B2
(45) Date of Patent: Mar. 29, 2016

(54) APPARATUS, SYSTEM AND METHOD FOR LOAD BALANCING TRAFFIC TO AN ACCESS POINT ACROSS MULTIPLE PHYSICAL PORTS

(71) Applicant: Hewlett-Packard Development Company, L.P., Houston, TX (US)

(72) Inventors: Jie Jiang, San Jose, CA (US); Steve Alexander, Woodside, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 116 days.

(21) Appl. No.: 13/837,228

(22) Filed: Mar. 15, 2013

(65) Prior Publication Data

US 2014/0269285 A1    Sep. 18, 2014

(51) Int. Cl.
*H04W 28/08* (2009.01)
*H04L 12/56* (2006.01)
*H04W 88/06* (2009.01)
*H04L 12/803* (2013.01)

(52) U.S. Cl.
CPC .................................... *H04L 47/125* (2013.01)

(58) Field of Classification Search
CPC ..... H04W 28/08; H04W 36/22; H04W 88/06; H04W 84/12; H04L 2012/5652; H04L 29/06102; H04L 47/125; H04L 61/2592; H04L 12/56
USPC ....................................... 370/230.1, 328, 392
See application file for complete search history.

(56) References Cited

U.S. PATENT DOCUMENTS

| | | | | |
|---|---|---|---|---|
| RE42,871 E * | 10/2011 | Forslow | ........................ | 709/227 |
| 2009/0318160 A1* | 12/2009 | Li | ................................ | 455/453 |
| 2009/0319644 A1* | 12/2009 | Fagioli et al. | ................. | 709/221 |
| 2010/0248715 A1* | 9/2010 | Lundsgaard et al. | ...... | 455/432.1 |
| 2011/0075556 A1* | 3/2011 | Li | ................................ | 370/230 |
| 2011/0116443 A1* | 5/2011 | Yu et al. | ........................ | 370/328 |
| 2013/0083724 A1* | 4/2013 | Sindhu et al. | ................. | 370/328 |
| 2013/0083725 A1* | 4/2013 | Mallya et al. | ................. | 370/328 |
| 2013/0083782 A1* | 4/2013 | Murphy et al. | ............... | 370/338 |

* cited by examiner

*Primary Examiner* — Edan Orgad
*Assistant Examiner* — Vanneilian Lalchinthang
(74) *Attorney, Agent, or Firm* — Mannava & Kang, P.C.

(57) ABSTRACT

A method for load balancing traffic from controller to destination access point (AP) via switch across multiple physical ports starts with controller receiving a packet from a source client device that is destined for destination client device associated with destination AP. The controller may select, based on an identifier associated with source or destination client device, a first or a second controller IP address. Controller may encapsulate the packet to generate an encapsulated packet including an outer header that includes the selected controller IP address. Controller may transmit the encapsulated packet to the switch that may distribute traffic to destination AP across multiple physical ports based on the selected controller IP address. Controller may also select a destination port based on destination client device of a packet and may encapsulate the packet using CAPWAP to generate an encapsulated packet including the destination port in a header of the encapsulated packet.

21 Claims, 4 Drawing Sheets

APPARATUS, SYSTEM AND METHOD FOR LOAD BALANCING TRAFFIC TO AN ACCESS POINT ACROSS MULTIPLE PHYSICAL PORTS

FIELD

Embodiments of the invention relate generally to apparatuses, systems and methods for load balancing traffic from a controller to an access point via an Ethernet switch across multiple physical ports.

BACKGROUND

Currently, in a centralized WLAN architecture, the data packets tunneled from one controller to a given AP via an Ethernet switch that are encapsulated using Generic Routing Encapsulation (GRE) or IP-in-IP or Control And Provisioning of Wireless Access Points (CAPWAP) include the same outer IP header (5-tuple).

Accordingly, when the existing Ethernet switches receive the encapsulated data packets including the same outer IP header, the existing Ethernet switches are unable to effectively distribute packets to different physical ports within an Ether-channel. Thus, the downstream throughput of the access point is limited.

SUMMARY

In order to improve the downstream throughput of an access point (AP) that has a plurality of physical ports (e.g., Gigabit Ethernet (GE) physical ports) coupled to the plurality of physical ports (e.g., Gigabit Ethernet (GE) physical ports) included on the Ethernet switch, the traffic load from the Ethernet switch must be load balanced across the plurality of physical ports on the AP.

In some embodiments, a method for load balancing traffic from controller to destination access point (AP) via switch across multiple physical ports starts with controller receiving a packet from a source client device that is destined for destination client device associated with destination AP. The controller may select as the controller IP address, based on an identifier associated with source or destination client device, a first or a second controller IP address. The controller may encapsulate the packet to generate an encapsulated packet including an outer header that includes the selected controller IP address. The controller may transmit the encapsulated packet to the switch that may distribute traffic to destination AP across multiple physical ports based on the selected controller IP address. In one embodiment, the first and second controller IP addresses are consecutive IP addresses.

An apparatus may include a storage to store instructions, a network interface and a processor. The network interface may receive a packet originating from a source client device that is destined for a destination client device associated with a destination AP. The processor may execute the instructions, wherein executing the instructions may cause the processor to: select as a controller IP address, based on an identifier associated with the source client device or the destination client device, a first controller IP address or a second controller IP address, and encapsulate the packet to generate an encapsulated packet including an outer header that includes the selected controller IP address.

A system may comprises an Ethernet switch, a destination AP, and a controller. The Ethernet switch may have a plurality of physical ports including a first and a second physical port. The destination AP may have physical ports that are respectively coupled to the first and second physical ports of the Ethernet switch. The controller may be communicatively coupled to the Ethernet switch. The controller may receive a packet originating from a source client device that is destined for a destination client device associated with the destination AP, may select as a controller IP address, based on an identifier associated with the source client device or the destination client device, a first controller IP address or a second controller IP address, and may encapsulate the packet to generate an encapsulated packet including an outer header that includes the selected controller IP address.

In another embodiment, a method for load balancing traffic from a controller to a destination access point (AP) via an Ethernet switch across a plurality of physical ports starts by receiving by the controller a packet originating from a source client device that is destined for a destination client device associated with the destination AP. The controller may select a destination port based on the destination client device and may encapsulate the packet using CAPWAP to generate an encapsulated packet including the destination port in a header of the encapsulated packet. The controller may also transmit the encapsulated packet to the Ethernet switch that selects one of the plurality of physical ports based on the destination port included in the encapsulated packet to transmit the encapsulated packet to the destination AP.

The above summary does not include an exhaustive list of all aspects of the present invention. It is contemplated that the invention includes all systems, apparatuses and methods that can be practiced from all suitable combinations of the various aspects summarized above, as well as those disclosed in the Detailed Description below and particularly pointed out in the claims filed with the application. Such combinations may have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

Figure 1:
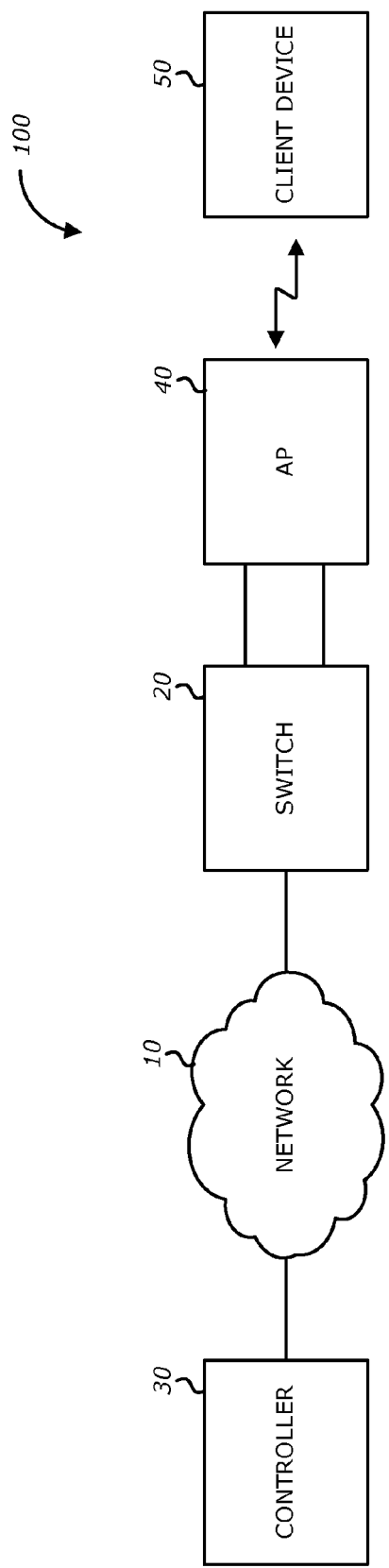
FIG. 1 shows a block diagram of the components of the network system in which an embodiment of the invention may be implemented.

FIG. 1 shows a block diagram of the components of the network system in which an embodiment of the invention may be implemented. In FIG. 1, the network system 100 includes a trusted and/or un-trusted network 10 coupled to an Ethernet switch 20 and/or at least one controller 30. The network 10 may be a wireless network operating according to 802.11 standards (WiFi or Wireless Local Area Network, WLAN, IEEE 802.11ac, IEEE 802.11n). The network 10 may also be a wired network (e.g., IEEE 802.3) that is connected to the Ethernet switch 20 and/or the controller 30. In some embodiments, the Ethernet switch 20 is an Ethernet switch having a plurality of physical ports. For instance, the physical ports may be Gigabit Ethernet (GE) physical ports.

In one embodiment, the system 100 includes at least one access point (AP) 40 that is coupled to at least one client device 50. The AP 40 may be an IEEE 802.11 AP that includes two GE uplinks. As shown in FIG. 1, the switch 20 may be coupled to the AP 40 via the two GE uplinks. In this example, the switch 20 may include two GE physical ports that are respectively connected to the AP 40 via the two GE uplinks, respectively. Each of the links may provide a throughput of up to 1 GB. The AP 40 may be connected to at least one client device 50 to provide access to the network 10 to the client device 50. The connection between the AP 40 and the client device 50 may be a wired connection or a wireless connection. The client device 50 may be a wireless device or wired device. For instance, the client device 50 may be consumer electronic device such as a general-purpose computer, a laptop computer, a mobile telephone communications device having data capabilities (e.g., smartphones), a tablet computer, and a personal digital media player.

In one embodiment, the controller 30 may provide support to the AP 40. For instance, in some embodiments, the controller 30 may maintain configurations, automates updates for the AP 40, provides network protection (e.g., firewall, wireless intrusion protection, secure remote connections, etc) as well as optimize radio connections.

Figure 2:
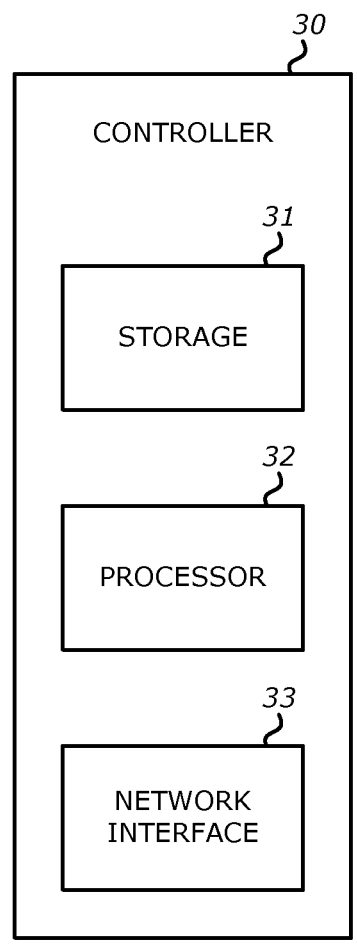
FIG. 2 shows a block diagram of the details of one of the components of the network system in which an embodiment of the invention may be implemented.

FIG. 2 shows a block diagram of the details of controller 30 of the network system in which an embodiment of the invention may be implemented. In this embodiment, the controller 30 is a purpose-build digital device that comprises data storage 31, a processor 32, and a network interface 33.

The data storage 31 of the controller $30_1$ may include a fast read-write memory for storing programs and data during the controller $30_1$'s operations and a hierarchy of persistent memory such as ROM, EPROM, and Flash memory for storing instructions and data needed for the controller $30_1$'s startup and a file system for the controller $30_1$'s operations.

The network interface 33 may include a wired network interface such as an IEEE 802.3 Ethernet interface as well as a wireless interface such as an IEEE 802.11 WiFi interface (e.g., 802.11ac interface). In the embodiment illustrated in FIG. 1, the network interface 33 is connected to the network 10 and may transmit data packets to the client device 50 via the switch 20 and the AP 40, respectively.

As shown in FIG. 2, the processor 32 is coupled to the data storage 31 and the network interface 33. The processor 32 may be any processing device including, but not limited or restricted to a MIPS-class processor, a microprocessor, a digital signal processor, an application specific integrated circuit, a microcontroller, a state machine, or any type of programmable logic array. In one embodiment, the controller $30_1$ may operate under the control of software or an operating system (OS), such as Linux, running specific programs to provide for controller operation. The operating system may be stored in the data storage 31 and executed by the processor 32 to cause the controller $30_1$ to perform controller operations.

Referring back to FIG. 1, in one embodiment, the controller 30 may receive data from a plurality of sources (e.g., client devices, access points, servers, networks etc.) In one embodiment, the data received by the controller 30 is a data packet destined for the client device 50 that originated from another client device ("source client device"). The data may be a packet that comprises a header with a source address field and a destination address field. The source address field of the packet may include an IP address of a client device from which the packet originates ("source client device"). The destination address field of the packet may include an IP address of the client device 50 ("destination client device").

In one embodiment, the controller 30 is assigned two consecutive IP addresses (e.g., a first and a second controller IP address) to be associated with the controller 30. The controller 30 may select one of the two consecutive IP addresses based on an identifier associated with the source client device and/or an identifier associated with the destination client device. In one embodiment, the identifiers associated with the source and destination devices, respectively, may be IP addresses. For instance, the controller 30 may select one of the two consecutive IP addresses based on at least one of the IP address of the source client device and the IP address of the destination client device. In one embodiment, for two consecutive IP addresses associated with two destination client devices, the controller $30_1$ selects different controller IP addresses. In one embodiment, the controller selects the controller IP address based on at least one of: a service set identification (SSID) associated with the source client device and/or the destination client device and a radio associated with the source client device and/or the destination client device.

In one embodiment, the controller 30 encapsulates the packet originating from the source client device using the GRE or IP-in-IP tunneling protocol to generate an encapsulated packet that includes an inner IP header and an outer IP header. The inner header may include a source address field and a destination address field. The source address field of the inner header includes the IP address of the source client device and the destination address field of the inner header includes the IP address of the client device 50 (the destination client device). The outer header may also include a source and a destination address field which may respectively include the controller IP address that was selected (e.g., the first or the second controller IP address) and the IP address of the AP 40 which is associated with the destination client device 50. For example, the controller 30 may select the first controller IP address based on an identifier of the destination client device 50 (e.g., IP address, SSID, radio, etc.) and encapsulates the packet to include the first controller IP address in the outer header. Thus, these two consecutive IP addresses that have been assigned to the tunnel endpoint of the controller 30 for different SSIDs, radios or client devices ensures that the encapsulated data packets from the controller 30 to AP 40 will have the same destination IP address in the outer header (e.g., destination AP 40's IP address) but a different source IP address in the outer header (e.g., first or second controller IP address for controller 30).

Further, by assigning two consecutive IP addresses to the tunnel endpoint on the controller 30 which may be selected, the controller 30 ensures that the source IP address in the outer header of the encapsulated packet being transmitted to the Ethernet switch 20 may be different even though it is transmitted from the same controller 30. In one embodiment, the controller 30₁ selects different controller IP addresses for packets that originate from different client devices, different servers or networks (not shown in FIG. 1). When the switch 20 receives the encapsulated packet from the controller 30 via the network 10, the switch 20 may select one of the physical ports included in the switch 20 based on the controller IP address that is included in the outer header of the encapsulated packet. For instance, the switch 20 may include a first physical port that is selected to transmit the encapsulated packet when the encapsulated packet includes the first controller IP address and may include a second physical port that is selected when the encapsulated packet includes the second controller IP address. In one embodiment, the switch 20 hashes the outer header of the encapsulated packet to determine which physical port to select for transmission of the encapsulated packet to the AP 40. Accordingly, by ensuring that the outer header of the encapsulated packet received by the switch 20 is different, the hash of the outer header will be different such that the switch 20 may utilize more than one physical port within the Ether-channel. In the embodiment where the AP 40 is an IEEE 802.11ac AP, the throughput of the AP 40 is increased from 1 GB to 2 GB. Referring back to the previous example, when the Ethernet switch 20 receives the encapsulated packet from the controller 30 destined for the client device 50, the Ethernet switch 20 may selects the first physical port based on a hash of the outer header including the first controller IP address.

In another embodiment, the controller 30 may encapsulate the packet using the Control And Provisioning of Wireless Access Point (CAPWAP) protocol instead of the GRE protocol to generate the encapsulated packet including the destination UDP port in the outer header of the encapsulated packet. The controller 30 may select a different UDP port based on the destination client device 50 so that the Ethernet switch 20 connected to the AP 40 can distribute traffic across multiple physical ports based on the layer 4 port in the outer header of an encapsulated packet.

In one embodiment, the controller 30 selects a different UPD destination port based on at least one of: a destination client device 50's IP address, a service set identification (SSID) associated with the destination client device 50, and a radio associated with the destination client device 50. In this embodiment, the multiple UDP ports are used to distinguish traffic to each client device. In this embodiment, while the encapsulated packets from the controller 30 to AP 40 have the same source and destination IP address included therein, the (UDP) destination port may be different for client device 50 as opposed to another client device that may be connected to AP 40₄ (not shown in FIG. 1). Accordingly, in this example, when the switch 20 receives the encapsulated packet, the switch 20 may select one of the plurality of physical ports based on the destination port included in the outer header of the encapsulated packet. In another embodiment, the controller 30 selects a different UPD destination port based on at least one of: a source client device's IP address, an SSID associated with the source client device, and a radio associated with a source client device. In one embodiment, the switch 20 may hash the outer header of the encapsulated packet and select the physical port to be used to transmit the encapsulated packet based on the hash obtained. Accordingly, by ensuring that the outer header of the encapsulated packet received by the switch 20 is different, the hash of the outer header will be different such that the switch 20 may utilize more than one physical port within the Ether-channel. In the embodiment wherein the AP 40 is an IEEE 802.11ac AP, the downstream throughput between the switch 20 and the AP 40 is increased from 1 GB to 2 GB since both GE physical ports may be used.

The following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 3:
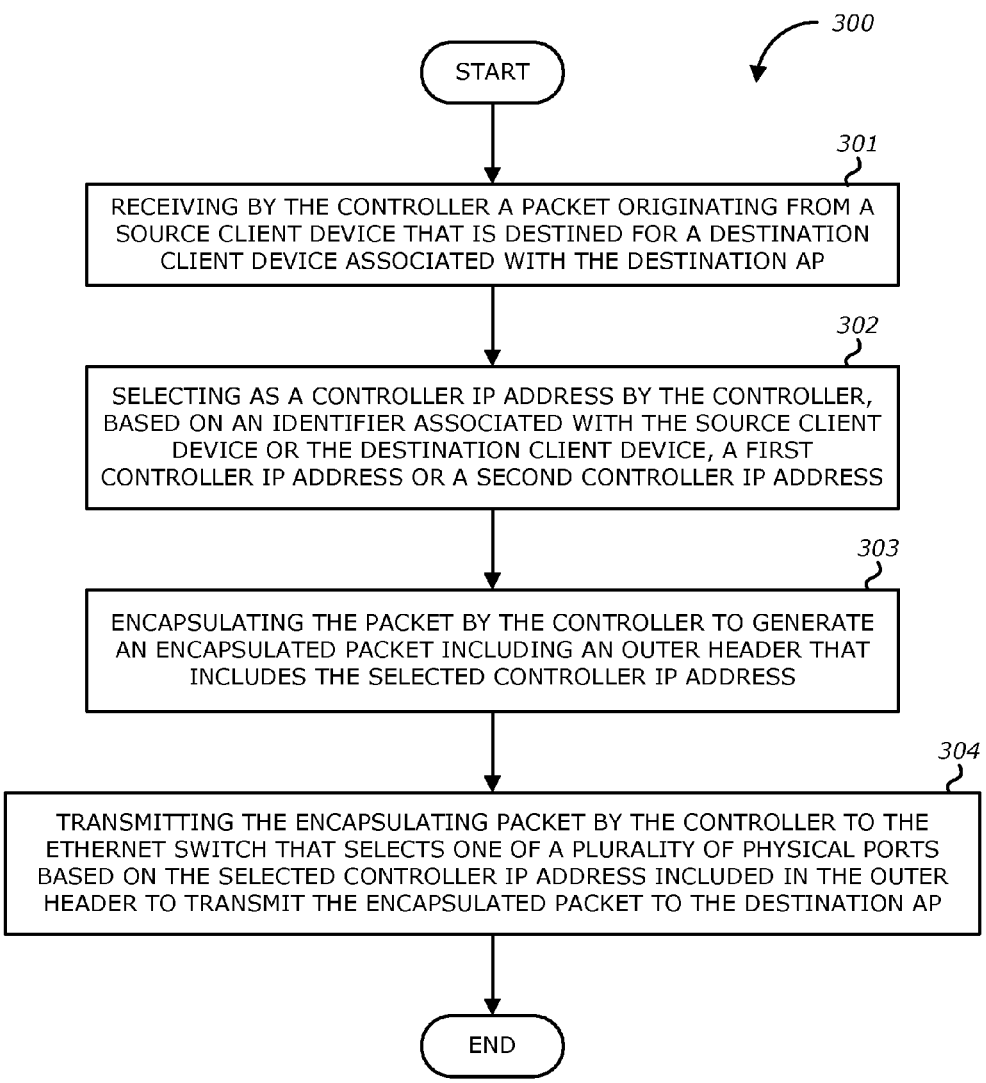
FIG. 3 shows a flow diagram of an example method for load balancing traffic from a controller to an access point via an Ethernet switch across multiple physical ports according to a first embodiment of the invention.

FIG. 3 shows a flow diagram of an example method for load balancing traffic from a controller 30 to an AP 40 via an Ethernet switch across multiple physical ports according to a first embodiment of the invention. In this embodiment, method 300 starts, at Block 301, with the network interface 33 of the controller 30 receiving a packet originating from a source client device that is destined for a destination client device 50 associated with a destination AP. The packet may include an identifier associated with the source client device and an identifier associated with the destination client device 50. In one embodiment, the identifier is at least one of: an IP address, a SSID, and a radio. At Block 302, the processor 32 of the controller 30 selects based on the identifier associated with the source client device or the destination client device 50 included in the packet either a first controller IP address or a second controller IP address. In one embodiment, the first and second controller IP addresses are two consecutive IP addresses associated with the controller 30. At Block 303, the processor 32 of the controller 30 encapsulates the packet using GRE to generate an encapsulated packet that includes the selected controller IP address (i.e., the first or the second controller IP address) in the outer header of the encapsulated packet. The encapsulated packet may also include the destination AP's IP address in the outer header. The encapsulated packet may also have an inner header that may include the identifier associated with the source client device and the identifier associated with the destination client device 50. At Block 304, the network interface 33 of the controller 30 transmits the encapsulated packet to the Ethernet switch 20 via the network 10. In this embodiment, the Ethernet switch 20 selects a first physical port when the encapsulated packet includes the first controller IP address and selects a second physical port when the encapsulated packet includes the second controller IP address. The Ethernet switch 20 may use the selected physical port to transmit the encapsulated packet to the destination AP 40.

Figure 4:
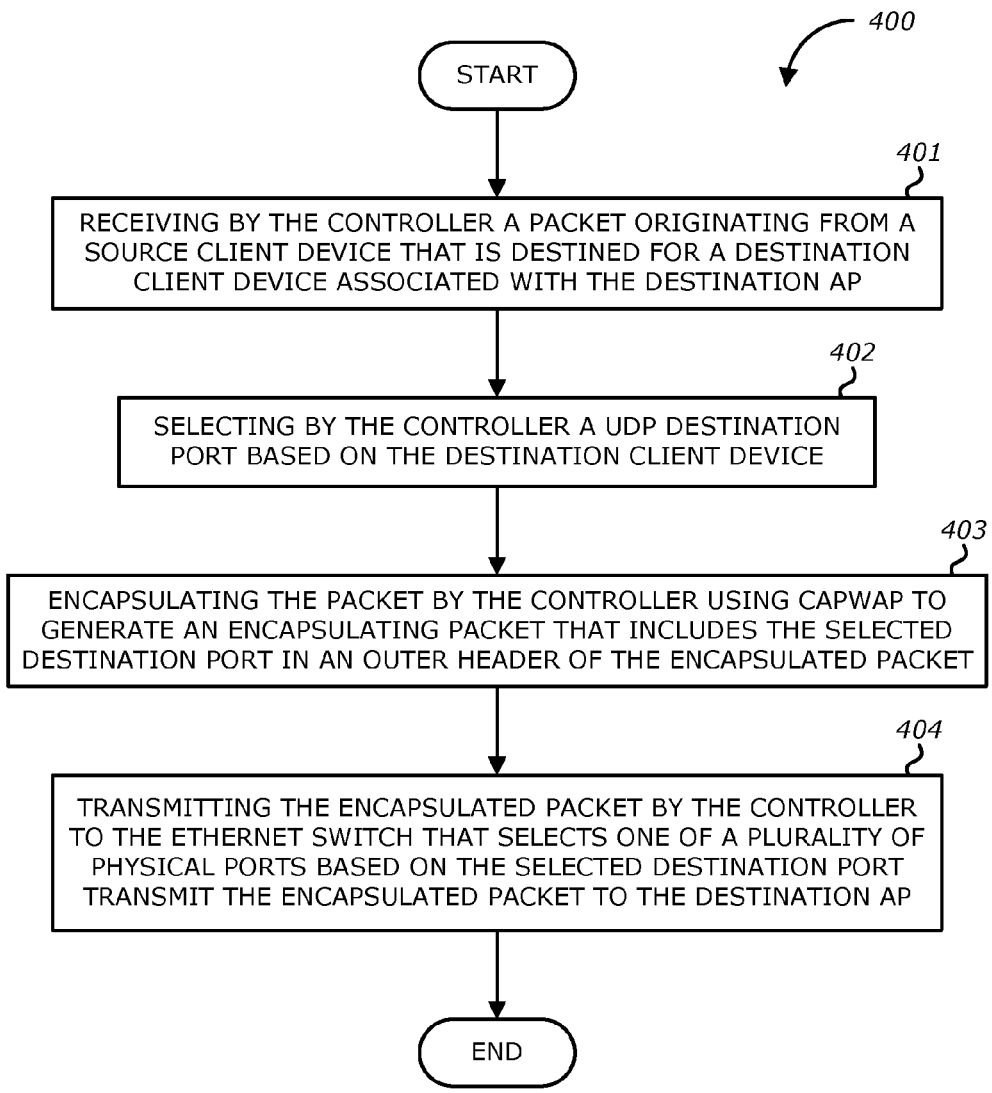
FIG. 4 shows a flow diagram of an example method for load balancing traffic from a controller to an access point via an Ethernet switch across multiple physical ports according to a second embodiment of the invention.

FIG. 4 shows a flow diagram of an example method for load balancing traffic from a controller to an AP via an Ethernet switch across multiple physical ports according to a second embodiment of the invention. In this embodiment, method 400 starts with the network interface 33 of the controller 30 receiving a packet originating from a source client device that is destined for a destination client device 50 that is coupled to a destination AP 40 (Block 401). At Block 402, the processor 32 of controller 30 selects a UDP destination port based on the destination client device 50. In one embodiment, the destination port is selected based on at least one of: a destination client device 50's IP address, a service set identification (SSID) associated with the destination client device 50, and a radio associated with the destination client device 50. At Block 403, the processor 32 of the controller 30 encapsulates the packet using CAPWAP to generate an encapsulated packet that includes the selected destination port in an outer header of the encapsulated packet. At Block 404, the network interface 33 of the controller 30 transmits the encapsulated packet to the Ethernet switch 20 which selects one of the plurality of physical ports based on the destination port included in the encapsulated packet to further transmit the encapsulated packet to the destination client device 50 via the destination AP 40. In one embodiment, the Ethernet switch 20 uses the destination UDP port in the outer header of the encapsulated packet to transmit the encapsulated packet to the destination AP 40.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

The invention claimed is:

1. A computer implemented method, comprising:
   receiving, at a network device, a network data packet that is destined for a destination client device associated with a destination access point (AP);
   selecting, by the network device, one of a first controller network address and a second controller network address to control which of a first physical port and a second physical port a network switch uses to transmit the network data packet to the destination AP;
   encapsulating, by the network device, the network data packet with the selected one of the first controller network address and the second controller network address to generate an encapsulated data packet including the outer header; and
   transmitting the encapsulated data packet to the network switch, wherein the network switch is to transmit the encapsulated data packet to the destination AP using the first physical port of the network switch in response to the outer header including the first network controller address or using the second physical port of the network switch in response to the outer header including the second network controller address.

2. The method of claim 1, wherein the first controller network address and the second controller network address are of the network device.

3. The method of claim 1, wherein the first controller network address is a network address of an origin of the network data packet.

4. The method of claim 1, further comprising:
   determining a characteristic of the network data packet;
   identifying a destination port number for use in the outer header of the encapsulated data packet using the determined characteristic of the network data packet, and
   wherein selecting one of the first controller network address and the second controller network address further comprises selecting one of the first controller network address and the second controller network address based upon the destination port number for use in the outer header.

5. The method of claim 1, wherein the network switch is to use a hash of the outer header of the encapsulated data packet to determine whether the encapsulated data packet is to be transmitted to the destination AP using the first physical port of the network switch or the second physical port of the network switch.

6. The method of claim 1, further comprising:
   identifying a destination network address for use in the outer header of the encapsulated data packet from a determined characteristic of the network data packet.

7. The method of claim 1, wherein selecting one of the first controller network address and the second controller network address further comprises selecting one of the first controller network address and the second controller network address based upon a determined characteristic of the network data packet, wherein the determined characteristic is an identifier associated with an origin of the network data packet or with a destination of the network data packet.

8. A network device comprising:
   one or more processors;
   a non-transitory computer readable medium communicatively coupled to the one or more processors, the non-transitory computer readable medium including instructions that, when executed by the one or more processors, cause the one or more processors to:
   receive a network data packet that is destined for a destination client device associated with a destination access point (AP);
   select one of a first controller network address and a second controller network address to control which of a first physical port and a second physical port a network switch uses to transmit the network data packet to the destination AP;
   encapsulate the network data packet with the selected one of the first controller network address and the second controller network address to generate an encapsulated data packet including the outer header; and
   transmit the encapsulated data packet to the network switch, wherein the network switch is to transmit the encapsulated data packet to the destination AP using the first physical port of the network switch in response to the outer header including the first network controller address or using the second physical port of the network switch in response to the outer header including the second network controller address.

9. The network device of claim 8, wherein the first controller network address and the second controller network address of the network device.

10. The network device of claim 8, wherein the first controller network address is a network address of an origin of the network data packet.

11. The network device of claim 8, wherein the instructions, when executed by the one or more processors, cause the one or more processors to:
    determine a characteristic of the network data packet;
    identify a destination port number for use in the outer header of the encapsulated data packet using the determined characteristic of the network data packet, and wherein to select one of the first controller network address and the second controller network address, the instructions are to cause the one or more processors to select one of the first controller network address and the second controller network address based upon the destination port number for use in the outer header.

12. The network device of claim 8, wherein the instructions are further to cause the one or more processors to use a hash of the outer header of the encapsulated data packet to determine whether the encapsulated data packet is to be transmitted to the destination AP using the first physical port of the network switch or the second physical port of the network switch.

13. The network device of claim 8, wherein the instructions are further to cause the one or more processors to:

identify a destination network address for use in the outer header of the encapsulated data packet from a determined characteristic of the network data packet.

14. The network device of claim 8, wherein to select one of the first controller network address and the second controller network address, the instructions are further to cause the one or more processors to select one of the first controller network address and the second controller network address based upon a determined characteristic of the network data packet, wherein the determined characteristic is an identifier associated with an origin of the network data packet or with a destination of the network data packet.

15. A non-transitory computer readable medium comprising instructions that, when executed by one or more processors, cause the one or more processors to:
   receive a network data packet that is destined for a destination client device associated with a destination access point (AP);
   select one of a first controller network address and a second controller network address to control which of a first physical port and a second physical port a network switch uses to transmit the network data packet to the destination AP;
   encapsulate the network data packet with the selected one of the first controller network address and the second controller network address to generate an encapsulated data packet including the outer header; and
   transmit the encapsulated data packet to the network switch, wherein the network switch is to transmit the encapsulated data packet to the destination AP using the first physical port of the network switch in response to the outer header including the first network controller address or using the second physical port of the network switch in response to the outer header including the second network controller address.

16. The medium of claim 15, wherein the first controller network address and the second controller network address of the network device.

17. The medium of claim 15, wherein the first network address is a network address of an origin of the network data packet.

18. The medium of claim 15, further comprising instructions that, when executed by the one or more processors, cause the one or more processors to:
   determine a characteristic of the network data packet;
   identify a destination port number for use in the outer header of the encapsulated data packet using the determined characteristic of the network data packet, and wherein to select one of the first controller network address and the second controller network address, the instructions are to cause the one or more processors to select one of the first controller network address and the second controller network address based upon the destination port number for use in the outer header.

19. The medium of claim 15, wherein the instructions are further to cause the one or more processors to use a hash of the outer header of the encapsulated data packet to determine whether the encapsulated data packet is transmitted to the destination AP using the first physical port of the network switch or the second physical port of the network switch.

20. The medium of claim 15, further comprising instructions that, when executed by the one or more processors, cause the one or more processors to:
   identify a destination network address for use in the outer header of the encapsulated data packet from a determined characteristic of the network data packet.

21. The medium of claim 15, wherein to select one of the first controller network address and the second controller network address, the instructions are further to cause the one or more processors to select one of the first controller network address and the second controller network address based upon a determined characteristic of the network data packet, wherein the determined characteristic is an identifier associated with an origin of the network data packet or with a destination of the network data packet.

* * * * *